(12) United States Patent
Stilleke et al.

(10) Patent No.: US 8,905,480 B2
(45) Date of Patent: Dec. 9, 2014

(54) FITTING FOR A VEHICLE SEAT

(75) Inventors: Martin Stilleke, Recklinghausen (DE); Christian Jokiel, Heiligenhaus (DE); Dieter Henkel, Remscheid (DE); Jürgen Stemmer, Remscheid (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 208 days.

(21) Appl. No.: 13/643,289

(22) PCT Filed: Feb. 5, 2011

(86) PCT No.: PCT/EP2011/000543
§ 371 (c)(1), (2), (4) Date: Dec. 27, 2012

(87) PCT Pub. No.: WO2011/134558
PCT Pub. Date: Nov. 3, 2011

(65) Prior Publication Data
US 2013/0214578 A1  Aug. 22, 2013

(30) Foreign Application Priority Data
Apr. 29, 2010  (DE) .......................... 10 2010 019 361

(51) Int. Cl.
*B60N 2/235* (2006.01)
*B60N 2/36* (2006.01)
*B60N 2/225* (2006.01)

(52) U.S. Cl.
CPC .............. *B60N 2/225* (2013.01); *B60N 2/366* (2013.01); *B60N 2/2252* (2013.01)
USPC ....................................................... 297/362

(58) Field of Classification Search
USPC ........................................................ 297/362
See application file for complete search history.

(56) References Cited

U.S. PATENT DOCUMENTS

| | | | |
|---|---|---|---|
| 4,916,962 A * | 4/1990 | Tsutsumi et al. | ............... 74/392 |
| 6,619,743 B1 | 9/2003 | Scholz et al. | |
| 6,799,806 B2 | 10/2004 | Eppert et al. | |
| 7,086,699 B1 * | 8/2006 | Addison et al. | ............... 297/374 |

(Continued)

FOREIGN PATENT DOCUMENTS

| DE | 44 36 101 A1 | 6/1995 |
|---|---|---|
| DE | 19 548 809 C1 | 5/1997 |

OTHER PUBLICATIONS

International Search Report dated Apr. 6, 2011 as received in corresponding PCT Application No. PCT/EP2011/000543.

*Primary Examiner* — Sarah B McPartlin
(74) *Attorney, Agent, or Firm* — Foley & Lardner LLP

(57) ABSTRACT

A fitting for a vehicle seat includes a first fitting part, a second fitting part, and an eccentric, which is rotatably supported and is driven by a carrier and rotates in the circumferential direction, for driving a relative rolling motion of a spur gear and a ring gear. The eccentric has two wedge segments, which each have a convexly curved outer surface, a concavely curved inner surface, and two lateral surfaces. The lateral surfaces have a distance from each other and the inner surface and/or outer surface has a width that is less than the distance, and a transition area, which reduces the local axial dimension of the particular wedge segment from the distance to the width, is provided between at least one of the two lateral surfaces and the inner surface or the outer surface.

11 Claims, 3 Drawing Sheets

(56) References Cited

U.S. PATENT DOCUMENTS 7,314,250 B1 1/2008 Eblenkamp et al.
8,128,169 B2 * 3/2012 Narita et al. .................. 297/362

2002/0091029 A1 7/2002 Wang et al.
2006/0279121 A1 12/2006 Matsumoto et al.
2009/0127910 A1 5/2009 Stilleke et al.
2010/0013288 A1 * 1/2010 Mitsuhashi .................. 297/362

* cited by examiner

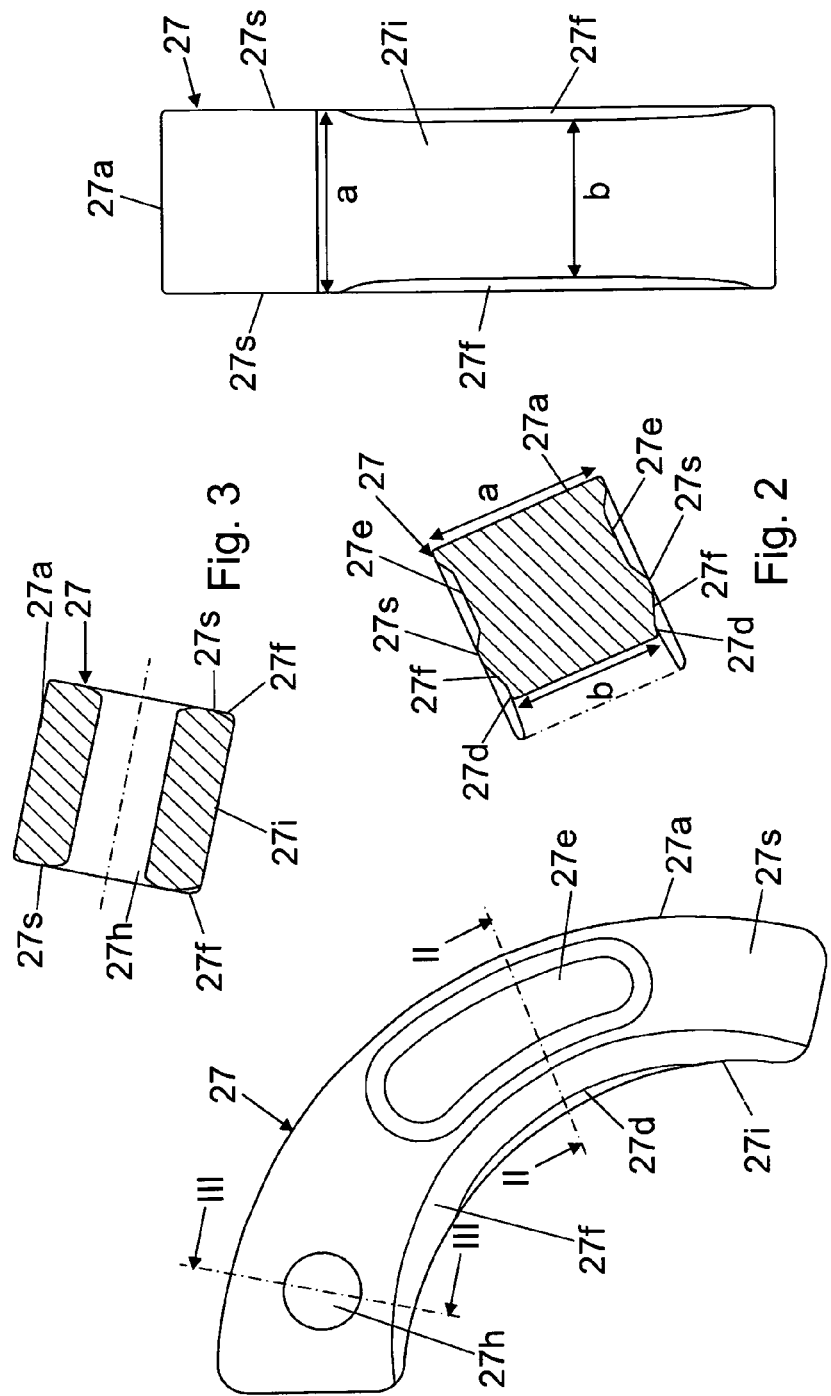

FITTING FOR A VEHICLE SEAT

CROSS REFERENCE TO RELATED APPLICATIONS

The present application is a National Stage of International Application No. PCT/EP2011/000543 filed on Feb. 5, 2011, which claims the benefit of German Patent Application No. 10 2010 019 361.5 filed on Apr. 29, 2010, the entire disclosures of which are incorporated herein by reference.

The invention relates to a fitting for a vehicle seat having the features of the preamble of claim 1.

A fitting of this type is known from DE 44 36 101 A1. The rolling movement defines cylinder coordinates. The wedge segments each have a broad side which faces towards each other in the circumferential direction and a narrow side which is faced away from each other in the circumferential direction, a convexly curved outer surface which faces radially outward, a concavely curved inner surface which faces radially inward, and two lateral surfaces which are parallel to each other. The inner surface is adjacent to a collar of the first fitting part, while the outer surface is adjacent to a slide bearing bush of the second fitting part. The lateral surfaces adjoin with one edge each to the outer surface and to the inner surface.

The object of the invention is to create an alternative fitting to the type mentioned in the introduction. This object is achieved according to the invention by a fitting having the features of claim 1. Advantageous configurations are the subject-matter of the subordinate claims.

Compared to wedge segments, where the lateral surfaces adjoin with an edge (curved in the shape of a circular arc) to the inner surface and/or outer surface, the provision of a transition area according to the invention reduces the width of the inner surface or of the outer surface with respect to the spacing of the lateral surfaces, i.e. to the prevailing axial dimension of the wedge segment. A person skilled in the art would assume that the static strength of the fitting is then reduced due to the reduced surface on which the wedge segment is supported. Nonetheless did the examination of the invention result in the fact that this prejudice, which has been existing until now, does not apply, but that rather a rise of static strength is surprisingly obtained with the transition area according to the invention. The transition area can be configured, for example, as a bevel, as a radius, as a step or as a combination thereof, so that a terraced shape of the wedge segment is formed. The transition area of the wedge segment reduces over a range of, for example, up to approximately ⅓ of the radial dimension of the wedge segment, the local axial dimension of the wedge segment from the spacing of the lateral surfaces for example to approx. ⅓, to the width of the inner surface and/or of the outer surfaces.

In the case of a bevel, such bevel can, with respect to its shape, preferably be a part of a shell surface of an inclined (with respect to the axis of curvature of the inner surface or of the outer surface) cylinder as a planar structure (two-dimensional manifold), so that the bevel is configured to have a sickle shape, i.e. in the radial direction it has a larger dimension in its center than at its both ends. Theoretically, it is, however, also conceivable that the bevel is part of a shell surface of a cone, i.e. that it can have a constant dimension in the radial direction. Particularly with the sickle shape, a step can additionally be provided between the bevel and the inner surface or the outer surface, such step limiting the dimension of the bevel in the axial direction, in order not to reduce the inner surface or the outer surface too much, despite the large dimension of the bevel.

The use of an eccentric epicyclic gear system between the first fitting part and the second fitting part enables the inclination of the backrest to be adjusted continuously. The saving of a central pinion compared with a planetary gear system leads to the occurrence of a wobbling movement which is superimposed on the relative rotation of the fitting parts. The eccentric epicyclic gear system can be driven manually or by a motor.

The basic part of the locking of the eccentric epicyclic gear is provided by the friction between the eccentric and one of the two fitting parts, preferably the second fitting part which preferably has a collar for supporting the eccentric. The wedge segments which define the eccentric serve for both, locking and driving the rolling movement of toothed wheel and toothed ring. A preferably additionally provided locking element serves for locking the fitting under dynamic loads.

The formation of the toothed ring on the first fitting part which receives the eccentric and the formation of the toothed wheel on the second fitting part which supports the eccentric saves material and installation space, since the toothed wheel can be configured on the radially outer edge of the second fitting part (over which the enclosing ring fixed to the first fitting part then engages) and nevertheless there are sufficiently large connecting areas on the second fitting part for mounting the fitting.

The invention can be used preferably for adjusting the inclination of the backrest of vehicle seats in motor vehicles, but it can be used also for other applications.

The invention is explained in more detail hereinafter with reference to an exemplary embodiment shown in the drawings, in which:

FIG. 1 shows a lateral view of a wedge segment,

FIG. 2 shows a cut along the line II-II in FIG. 1,

FIG. 3 shows a cut along the line III-III in FIG. 1,

FIG. 4 shows a further lateral view of the wedge segment with a view in the direction of the arrow IV in FIG. 1.

Figure 5:
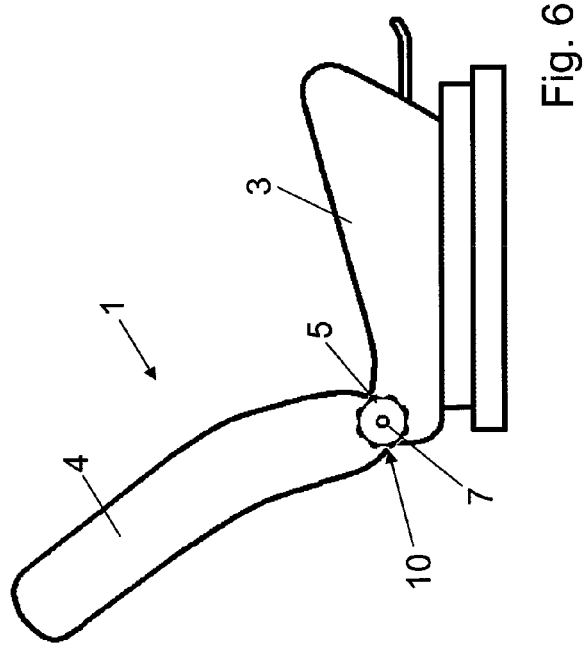
FIG. 5 shows a partial view of the fitting in the area of the wedge segments without driver and without spring.
Figure 6:
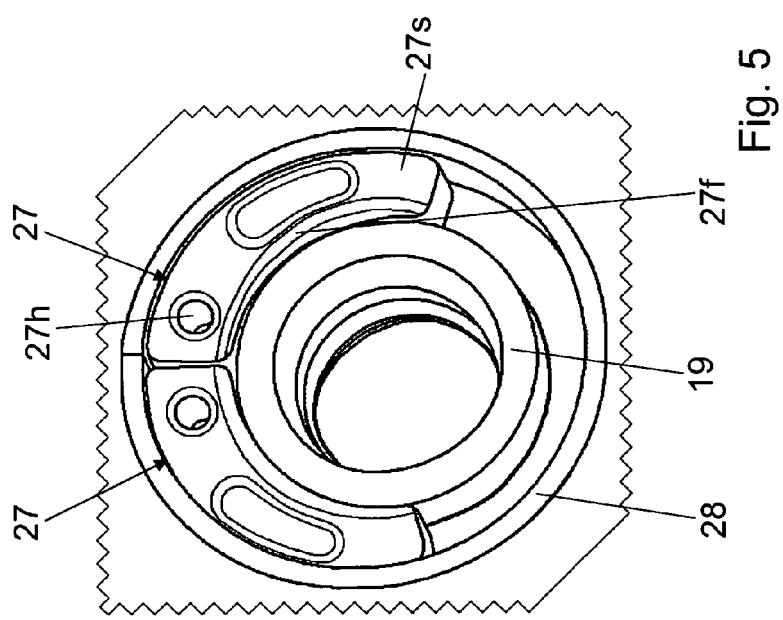
FIG. 6 shows a schematic view of a vehicle seat.
Figure 7:
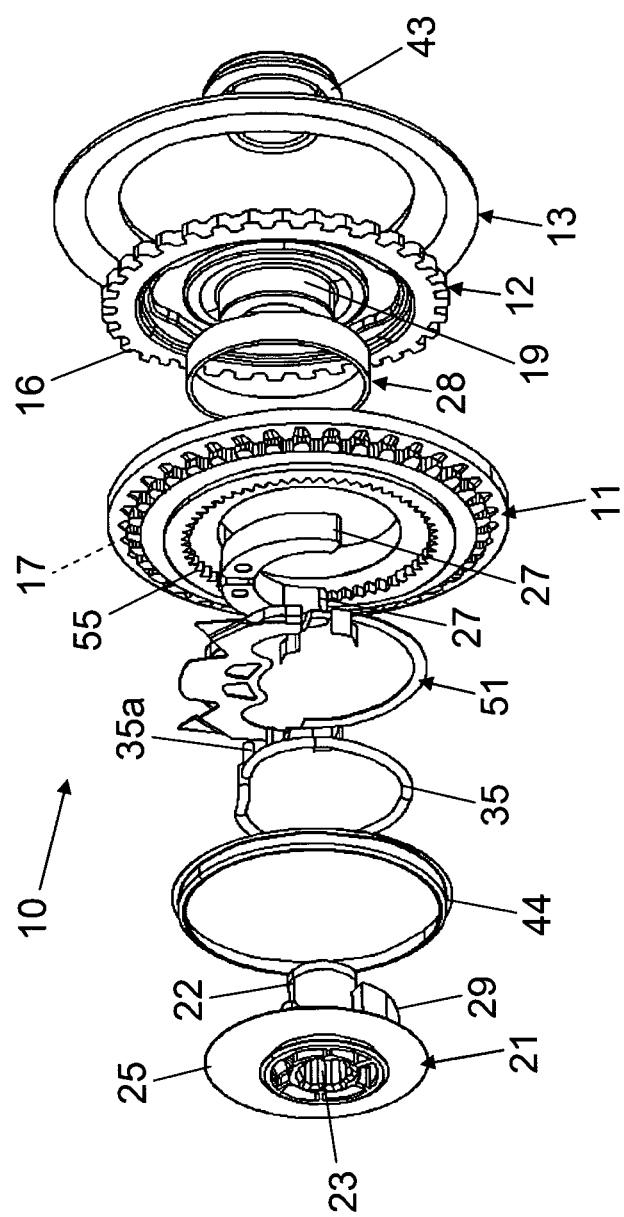
FIG. 7 shows an exploded view of the fitting with a schematic drawing of the wedge segments.

A vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure. The drive shaft 7 defines the adopted directional data of a cylinder coordinate system.

The fitting 10 has a first fitting part 11 and a second fitting part 12 which are rotatable relative to one another. Each of the two fitting parts 11 and 12 can be approximately inscribed in a circular disk shape. In order to absorb the axially acting forces, i.e. in order to hold the fitting parts 11 and 12 together, an enclosing ring 13 is provided. Such a method of holding parts together by means of an enclosing ring is described, for example, in U.S. Pat. No. 6,799,806 B2. The enclosing ring 13 which is preferably composed of metal is connected tightly to one of the two fitting parts 11 and 12, in the present case to the first fitting part 11, in an outer edge section, for example welded or beaded (at least partially in the circumferential direction). By means of an end section which is facing radially inwards, the enclosing ring 13 engages over the other one of the two fitting parts 11 and 12 radially outwards, optionally with the interposition of a separate sliding ring, without impeding the relative rotation of the two fitting parts 11 and 12. From a structural point of view, the two fitting parts 11 and 12 together (with the enclosing ring 13) consequently form a disk-shaped unit.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 can, however, also be exchanged, i.e. the first fitting part 11 would then be fixed with respect to the seat part and the second fitting part 12 would be fixed with respect to the backrest. The fitting 10 consequently is located in the force flow between backrest 4 and seat part 3; this is why the two fitting parts 11 and 12 are composed of metal, preferably of steel.

The fitting 10 is in the form of a gear fitting in which a first fitting part 11 and a second fitting part 12 are connected to each other by means of a gear unit for displacement and fixing in position, to be more precise, by means of an eccentric epicyclic gear system, which in the present case is self-locking as described, for example, in DE 44 36 101 A1.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16. The toothed wheel 16 and the toothed ring 17 are formed preferably by means of one single stamping process which simultaneously punches the fitting parts 11 and 12 from their initial material. Alternatively, the fitting parts 11 and 12 can be manufactured—with similar geometries and same functions—by massive forming (preferably cold-flow forming or hot-flow forming). In the present case, the toothed wheel 16 forms the radially outer edge of the second fitting part 12, i.e. radially outward the second fitting part 12 is flush with the toothed wheel 16.

One of the two fitting parts 11 and 12, has a collar 19, in the present case the second fitting part 12, concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disk 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the last-named fitting part is coated with a slide bearing bush 28 which is preferably pressed in to be rotationally fixed, and against which the outer surfaces of the wedge segments 27 bear. The notions "support" and "bear" shall not be limited to a defined direction of the flow of forces by the fitting 10, since this direction depends on the mounting of the fitting 10.

The driver 21 has—spaced radially from the hub 22—a driver segment 29 which engages with clearance between the narrow sides of the wedge segments 27 and which is formed in one piece with the covering disk 25 and the hub 22. The wedge segments 27, the broad sides of which are mutually facing, each receive, with a respective recess defined by projecting sections of material, a respective angled end finger 35*a* of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disk 25, such sealing ring being composed for example of rubber or of soft plastics material and being connected with, in particular clipped to, the covering disk 25.

The wedge segments 27 (and the spring 35) define an eccentric which, in the extension of the direction of eccentricity, presses the toothed wheel 16 into the toothed ring 17 at an engagement site. When drive is effected by means of the rotating drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

To improve the dynamic operating characteristics, a retaining spring 51 as has been disclosed, for example in DE 195 48 809 C1, the disclosure of which is expressly incorporated herein, is still provided preferably as locking element. The retaining spring 51 in the present case cooperates with a toothing 55, which is configured as a further toothed ring at the first fitting part 11. The retaining spring 51 each time locks the wedge segments 27 in the non-driven state (by the retaining spring 51 locking the spring 35 by bearing against the end fingers 35*a*) and is released by the driven driver 21.

A modified configuration of the driver 21 is provided in the motor-driven versions, as described in U.S. Pat. No. 7,314, 250 B1 for a one-piece driver composed of metal, for example of zinc or aluminum pressure-die casing, and in US 2009/ 0127910 A1 for a two-piece driver composed of a metal ring (preferably of a sintered material) with driver segment 29 and a plastic component which is rotationally fixed with it, with a hub 22 and a covering disc 25. A modified two-piece driver is shown in U.S. Pat. No. 6,619,743 B1, according to which the wedge segments are supported on its ring. The relevant disclosure of the three mentioned printed publications is expressly incorporated herein.

In addition to the broad side and to the narrow side, each of which faces (opposed to each other) in the circumferential direction, and to the convexly curved outer surface 27a and the concavely curved inner surface 27i, each of which faces (opposed to each other) in the radial direction, each of the wedge segments 27 has the two lateral surfaces 27s which face (opposed to each other) into the axial direction and which have the curved wedge shape. The wedge segment 27 has a hole 27h for receiving the end finger 35a. The two lateral surfaces 27s are connected with each other by means of the wall of the hole 27h. The (maximum) axial spacing of the two lateral surfaces 27s from each other shall be designated spacing a. The (minimum) axial dimension of the inner surface 27i shall be designated width b. The two lateral surfaces 27s of each of the wedge segments 27 preferably are mirror-symmetrical, so that subsequently only one of the two lateral surfaces 27s and their environment is described.

The lateral surface 27s has an island-shaped indentation 27e, which is necessary for an optimum compression of the wedge segment 27 which has been manufactured by means of sintering. The indentations 27e can have a depth of, for example, 0.35 mm±20%, with a dimension of the wedge segment 27 of, for example, 6.0 mm±20% in the axial direction. The transition area between the lateral surface 27s and the indentation 27e can extend obliquely, for example at an angle of 30°±20%.

As transition area between the lateral surface 27s on the one hand and the inner surface 27i on the other hand, a bevel 27f is provided on the wedge segment 27—instead of an edge. The bevel 27f reduces the local axial dimension of the wedge segment 27 (i.e. the spacing of the two outermost end sections of the material, measured in the axial direction, with identical coordinates in the peripheral direction and in the radial direction) from the spacing a to the width b, preferably by about 5% to 20%. In the radial direction, the bevel 27f extends over preferably up to ⅓ of the radial dimension of the wedge segment 27. The shape of the bevel 27f preferably is part of a shell surface of a cylinder which is inclined with respect to the collar 19. The bevel 27f extends, for example, at an angle of 20°±20% with respect to the lateral surface 27s. In the circumferential direction, the bevel 27f is not configured continuously uniformly, but it is sickle-shaped, i.e., regarded along the circumferential direction, the bevel 27f is broader in its center (i.e. has a larger dimension in the radial direction) than at its two ends; in its center, it consequently protrudes further into the lateral surface 27s and into the inner surface 27i than at its ends in the transition area towards the broad side and towards the narrow side, where the bevel 27f nearly disappears. The bevel 27f, on the lateral surface 27s, thus extends almost up to the indentation 27e. For geometrical reasons (since otherwise the width b of the inner surface 27i is reduced too much), the bevel 27f adjoins the inner surface 27i preferably with a small (sickle-shaped) step 27d. This step 27d has a considerably smaller dimension than the bevel 27f, for example 0.4 mm±20% in its center. In the axial direction, the step 27d is displaced in parallel with respect to the lateral surface 27s, for example 0.4 mm±20% deeper than the lateral surface 27s.

In a modified configuration, the bevel 27f is provided alternatively or cumulatively between the lateral surface 27s on the one hand and the outer surface 27a on the other hand. In a further modification, the bevel 27f is provided at only one of the two lateral surfaces 27s (breaking the symmetry of the wedge segment). In further modifications, only the step 27d, and no bevel 27f, is provided.

LIST OF REFERENCE NUMERALS 1 vehicle seat
3 seat part
4 backrest
5 handwheel
7 drive shaft
10 fitting
11 first fitting part
12 second fitting part
13 enclosing ring
16 toothed wheel
17 toothed ring
19 collar
21 driver
22 hub
23 bore
25 covering disk
27 wedge segment
27a outer surface
27d step
27e indentation
27f bevel
27h hole
27i inner surface
27s lateral surface
28 slide bearing bush
29 driver segment
35 spring
35a end finger
43 securing ring
44 sealing ring
51 locking spring
55 toothing
a spacing (of the lateral surfaces)
b width (of the inner surface/outer surface)

The invention claimed is:

1. A fitting for a vehicle seat, comprising:
a first fitting part on which is formed a toothed ring,
a second fitting part on which is formed a toothed wheel which meshes with the toothed ring, as a result of which the two fitting parts are in gear connection with each other,
a rotatably supported circumferential eccentric, driven by a driver, for driving a relative rolling movement of the toothed wheel and the toothed ring, the eccentric having two wedge segments, each of which has a convexly curved outer surface which faces radially outward, a concavely curved inner surface which faces radially inward, and two lateral surfaces, wherein, in the axial direction, the lateral surfaces have a spacing from one another, and the inner surface and/or the outer surface have a width as dimension, wherein the width is smaller than the spacing, and that between at least one of the two lateral surfaces on the one hand and the inner surface or the outer surface a transition area is provided, which reduces the local axial dimension of the respective wedge segment from the spacing to the width,
wherein the transition area is configured as a bevel,
wherein the bevel is configured non-uniformly along the circumferential direction.

2. A fitting according to claim 1, wherein the spacing of the two lateral surfaces amounts to 6.0 mm±20% in the axial direction.

3. A fitting according to claim 1, wherein the width of the inner surface or of the outer surface amounts to 5.2 mm±20% in the axial direction.

4. A fitting according to claim 1, wherein the transition area reduces the axial dimension of the respective wedge segment from the spacing locally by 5%-20% to the width (b).

5. A fitting according to claim 1, wherein the bevel is sickle-shaped by having a larger dimension in its center than at its two ends in the radial direction.

6. A fitting according to claim 1, wherein the bevel extends at an angle of 20°±20% with respect to the lateral surface.

7. A fitting according to claim 1, wherein the bevel passes over to the inner surface and/or to the outer surface with a small step.

8. A fitting according claim 1, wherein a spring acts on the wedge segments in the circumferential direction, and/or that the spring engages into the wedge segments by means of two end fingers, and/or that the wedge segments particularly have one hole each for receiving the end fingers, and/or that each wedge segment has a broad side which faces the other wedge segment and a narrow side which is faced away from the broad side.

9. A fitting according to claim 1, wherein an enclosing ring axially holds together the first fitting part and the second fitting part forming a disk-shaped unit, such enclosing ring being fixed to the first fitting part and engaging over the second fitting part radially outside and particularly having a substantially flat shape, and/or in that the first fitting part receives the eccentric, particularly by means of a slide bearing bush which is concentric to the toothed ring, and/or in that the second fitting part supports the eccentric, particularly by means of a collar which is concentric to the toothed wheel.

10. A vehicle seat, with at least one fitting according to claim 1, having a seat part which is connected with one of the two fitting parts, and a backrest, which is connected with the other one of the two fitting parts.

11. A fitting according to claim 7, wherein the step has a dimension of up to 0.4 mm±20% in the axial and/or radial direction and/or is displaced in parallel with respect to the lateral surface in the axial direction.

* * * * *